United States Patent [19]

Honda

[11] Patent Number: 5,637,850
[45] Date of Patent: Jun. 10, 1997

[54] METHOD OF MAKING AND READING ENGRAVED AND OXIDATION CODE MARKS ON SURGICAL INSTRUMENTS

[76] Inventor: Takaharu Honda, 1-1530-1 Kaijincho Minami, Funabashi-shi, Chiba-ken, Japan

[21] Appl. No.: 579,456

[22] Filed: Dec. 27, 1995

Related U.S. Application Data

[63] Continuation of Ser. No. 237,512, May 3, 1994, abandoned.

[51] Int. Cl.⁶ ..................................................... G06K 7/10
[52] U.S. Cl. ........................... 235/454; 235/487; 235/470
[58] Field of Search .................................... 235/487, 494, 235/454, 470

[56] References Cited

U.S. PATENT DOCUMENTS

| | | | |
|---|---|---|---|
| 4,095,095 | 6/1978 | Muraoka et al. | 235/375 |
| 4,166,574 | 9/1979 | Yokoyama | 235/487 |
| 4,585,931 | 4/1986 | Duncan et al. | 235/464 |
| 4,745,269 | 5/1988 | Van Gils | 235/487 |
| 4,791,284 | 12/1988 | Ludden | 235/487 |
| 4,939,354 | 7/1990 | Priddy et al. | 235/456 |
| 5,177,346 | 1/1993 | Chisholm | 235/462 |
| 5,406,060 | 4/1995 | Gitin | 235/462 |
| 5,463,213 | 10/1995 | Honda | 235/467 |

*Primary Examiner*—John Shepperd
*Attorney, Agent, or Firm*—Jordan and Hamburg

[57] ABSTRACT

In order to that optically readable small code marks can be correctly read by a reader, an optically readable code mark 15 is marked on an surgical instrument 14 at an optional location by using a laser, the code mark being in the form of recesses and projections which are apparently different in magnitude from roughness of the instrument surface at that location. Thus, the code mark is marked on the surgical instrument itself by laser marking and is optically read, resulting in correct reading of the mark and a considerable improvement in durability of the mark.

12 Claims, 7 Drawing Sheets

METHOD OF MAKING AND READING ENGRAVED AND OXIDATION CODE MARKS ON SURGICAL INSTRUMENTS

This application is a continuation of application Ser. No. 08/237,512, filed May 3, 1994 now abandoned.

BACKGROUND OF THE INVENTION

1. Field of the Invention

The present invention relates to a method of marking so-called code marks on the surfaces of surgical instruments and other metal-made products and surgical instruments with code marks marked by using the method, and more particularly to the method of enabling small optically readable code marks to be correctly read by a reader.

2. Description of the Related Art

Optically readable code marks such as bar codes are becoming more commonly used in various fields. With the recent increase in the amount of information to be encoded in code marks, typical bar codes with which information can be encoded in only one direction only have become unable to provide a sufficient space for encoding.

Therefore, so-called binary code marks, by which information can be encoded in vertical and horizontal directions, have been put into use. As examples of this type of code mark, "carla code", "vericode" and "data code" have come into general use. Among them, the data code is disclosed in U.S. Pat. No. 4,939,354 and is designed such that individual cells of a grid pattern divided in vertical and horizontal directions are colored black or white to thereby create a code mark.

Meanwhile, the kinds of products provided with code marks have also been increasing recently. For example, code marks are put on surgical equipment, such as surgical instruments, for the purpose of inventory control of said equipment in hospitals. Since many surgical instruments are small in size, code marks are required to be correspondingly small on the order of, e.g., 2×2 mm in size. Furthermore, bar codes are also becoming increasingly used in books and other publications. In order not to mar the finish of bindings or covers, code marks put on books are ideally as small as possible.

In the case of the data code, a mark is taken in as an image by a camera, and the mark image in black and white is converted into a matrix comprised of 0's and 1's, thereby decoding the data encoded in the mark. For correct decoding of the data, therefore, black and white mark elements must be precisely and distinctly discriminated without errors and be displayed as an image. Then, even if a mark is small, a camera has to be able to take in such a small mark with correct discrimination between black and white.

However, if labels prepared with printed code marks are stuck to surgical instruments, in an attempt to put the data code on surgical instruments, the labels would be torn off or the code marks would become blurred, making it impossible to read the code soon, because the surgical instruments are washed and disinfected whenever used. In such an application field, therefore, it is desirable to mark code marks directly on the surface of the surgical instruments. This equally applies to other metal-made products for different uses where durability of the code mark is a problem, in addition to surgical instruments.

When a code mark is engraved on, e.g., surgical instruments by using a laser, recesses and projections on the metal surface are taken in the form of an image by a camera and are discriminated respectively as black and white elements of the mark. In other words, unlike a mark printed in black and white, a mark in the form of recesses and projections on a metal surface, which is not originally colored, has to be recognized as a black and white image. It is thus required that, when recesses and projections on the metal surface are photographed by a camera, they are correctly discriminated and reproduced to be black and white in the form of an image.

However, it is quite difficult to precisely mark small binary code marks, such as the carla code, vericode and data code, by the conventional methods of engraving or electrolytic erosion.

When a mark in the form of recesses and projections is marked on the metal surface, the reflecting condition of light is different depending upon differences in the finish of the metal surface (e.g., mirror surface, pear-skin or hairlines). Accordingly, such a mark must be marked in such a manner that it can be correctly read without being affected by the reflecting condition of light as much as possible.

Moreover, the shapes of surgical instruments are not fixed and portions in which marks are marked are not always flat. Accordingly, marks are also required to be marked in such a manner that they can be correctly read regardless of the shape of the surface.

SUMMARY OF THE INVENTION

Particularly, when the above-described data code is used, since black and white cells are discriminated at their centers, it is necessary to correctly read whether the centers of the cells are black or white.

When the data code is marked on a surgical instrument at an optional location, the data code must be marked in the form of recesses and projections in which the recesses are apparently different in magnitude from the roughness (ruggedness) of the instrument surface at that location. If not so, ruggedness specific to the surface would be discerned as black or white and would be mixed in as noise in read information, making it impossible to read the original data code in such an image condition given that its black and white cells were clearly discriminated.

In view of the above, the code mark marking method for surgical instruments according to the present invention resides in that an optically readable code mark is marked on a surgical instrument at an optional location by using a laser. The code mark is marked on mirror finished areas by engraving, and on areas other than mirror-finished by oxidation marking.

Also, a surgical instrument with a code mark according to the present invention resides in that an optically readable code mark is marked on the surgical instrument at an optional location by using a laser, the code mark being in the form of recesses and projections which are apparently different in magnitude from the roughness of the instrument surface at that location.

When the code mark is marked in a mirror finished area, it is engraved to cope with halation from the mirror finish so that engraved recesses and non-engraved projections can be discriminated and read as black and white cells in the form of an image.

On the other hand, when the code mark is marked in an area other than a mirror-finished one, it is marked by oxidation marking so that the marked portions are turned black to make the color of the marked portions completely different from the base color of the surgical instrument, thereby negating the influence of the ruggedness specific to the metal surface.

By optically reading the surgical instrument thus marked by a suitable reader, the code mark can be correctly read through clear discrimination between black and white.

DETAILED DESCRIPTION OF THE PREFERRED EMBODIMENT

Figure 1:
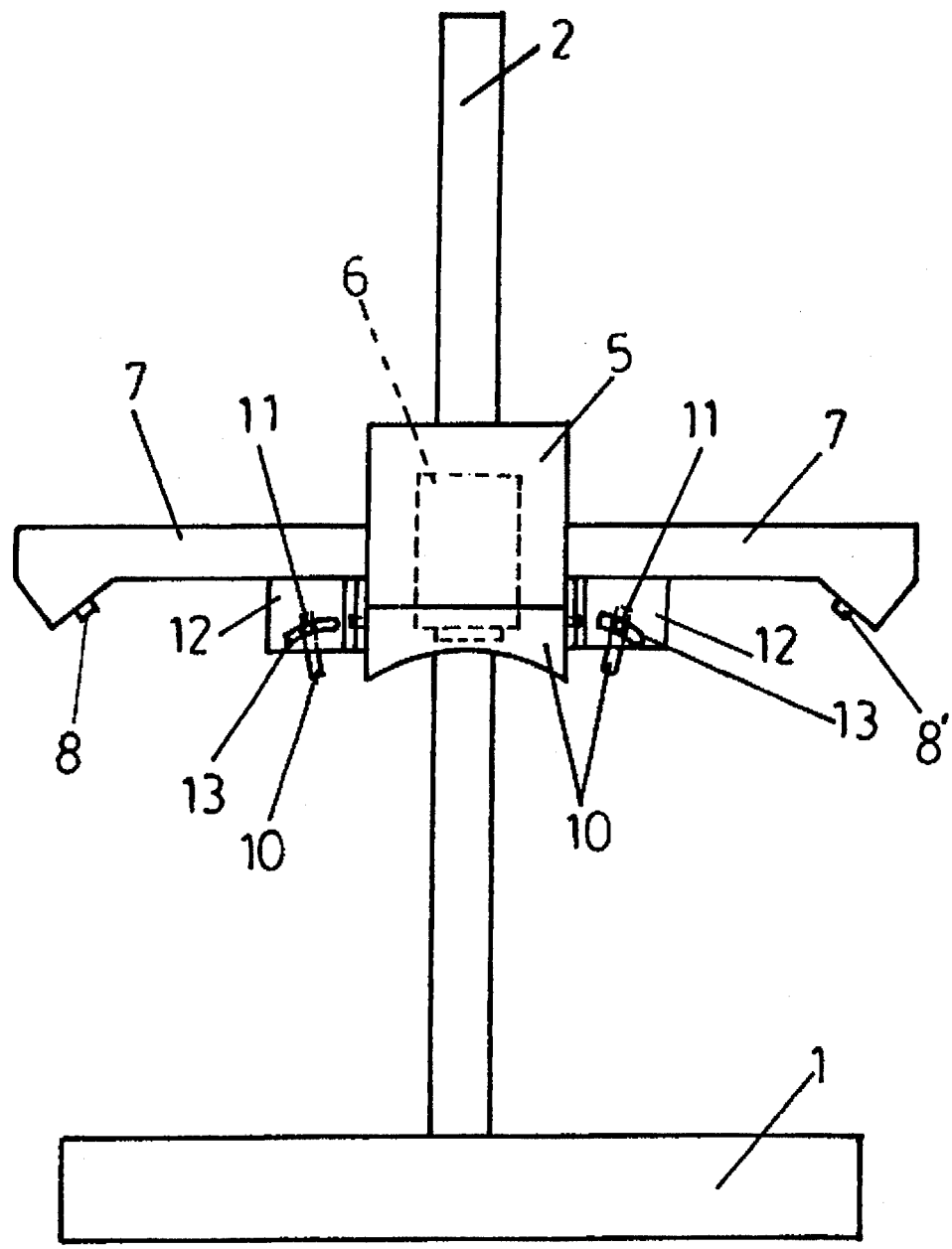
FIG. 1 is a front view of a code mark reader.

One embodiment of the code mark marking method for surgical instruments and a surgical instrument with a code mark according to the present invention will be described below with reference to FIG. 5.

Denoted by reference numeral 14 is a surgical instrument, and 15 is a code mark in the form of data code, previously explained, put on the surgical instrument 14 by laser marking. The data code 15 contains predetermined information represented as a code mark. Its marked contents or pattern change depending on the information to be encoded therein.

While a pair of scissors is shown in the illustrated embodiment, the surgical instrument 14 is not limited to scissors, but is also applicable to not only other surgical equipments such as surgical scissors and forceps, but also other various metal-made products. Further, it is needless to say that the code mark marked by laser marking is not limited to the data code 15, but may be of any other code mark, e.g., carla code and vericode. Additionally, the surgical instrument 14 is generally made of stainless steel, but metal materials are not limited thereto.

Figure 5:
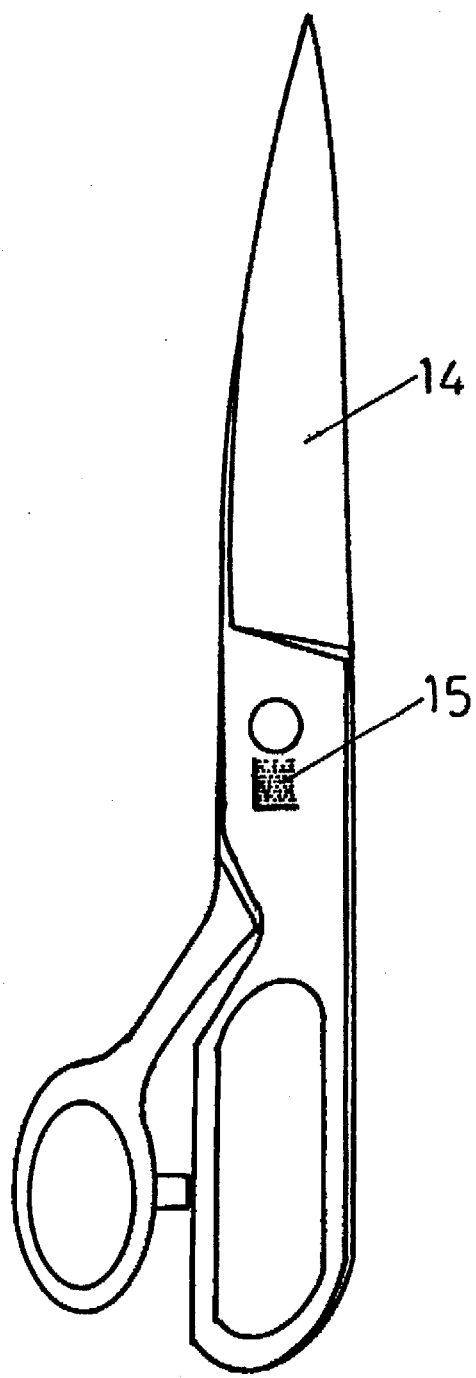
FIG. 5 is a plan view showing one example in which a data code is marked on surgical scissors.

When the surgical instrument 14 is marked in a mirror finished area, the data code 15 is formed by engraving such as shown at 15a in FIG. 5 a. As the engraved recesses have a larger depth, halation is prevented more effectively. However, depth of the engraved recesses larger than that least necessary is not required, meaning that the recesses should be engraved to a depth not overly exceeding above or below a proper value.

Figure 5B:
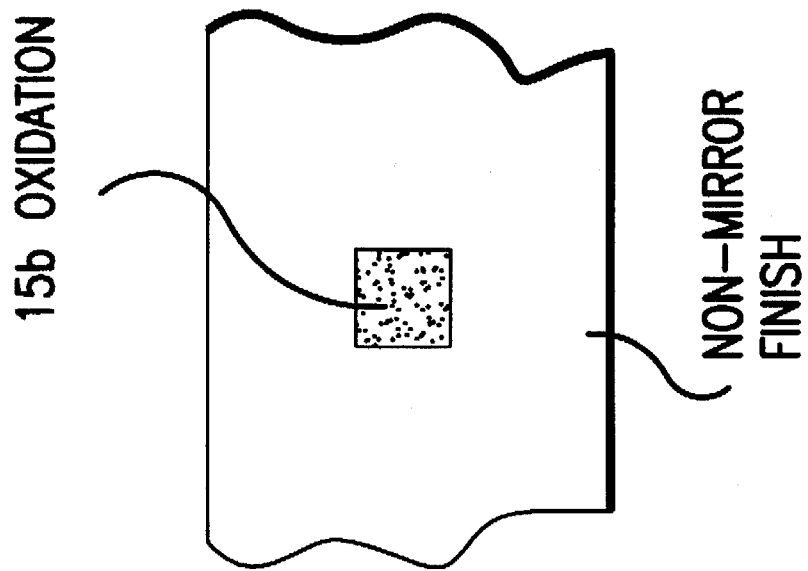
FIG. 5b is a schematic representation, on an enlarged scale., illustrating, in cross-section, the data code formed by oxidation.
Figure 5A:
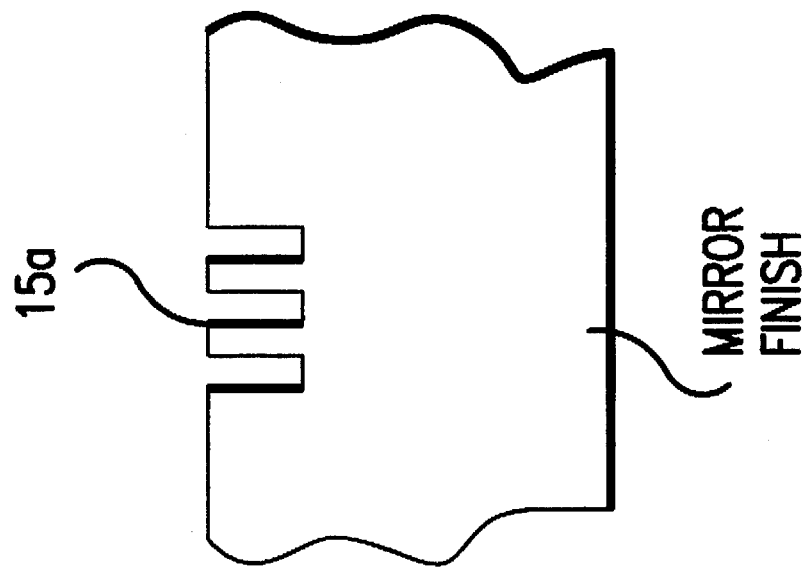
FIG. 5a is a schematic representation, on an enlarged scale, illustrating, in cross-section, the data code formed by engraving.

Further, where the surgical instrument 14 is marked in an area which is other than being mirror-finished and has ruggedness, the data code 15 is formed by oxidation marking using a laser, rendering the marked portions black such as shown at 15b in FIG. 5b. The reason is as follows. When the surgical instrument has a pear-skin or hairline finish, its surface is not smooth. Therefore, if the surface is engraved, whether the recesses and projections under reading are marked ones OF are due to ruggedness specific to the surface could not be discerned by the image.

By employing the above-mentioned marking method, the data code 15 in the form of recesses and projections, which are apparently different in magnitude from roughness of the ground surface in the marked area and hence surely optically readable, can be made. Thus, when optically reading the data code 15, it can be correctly recognized as a black and white image without being affected by the condition of surface finish.

Figure 6:
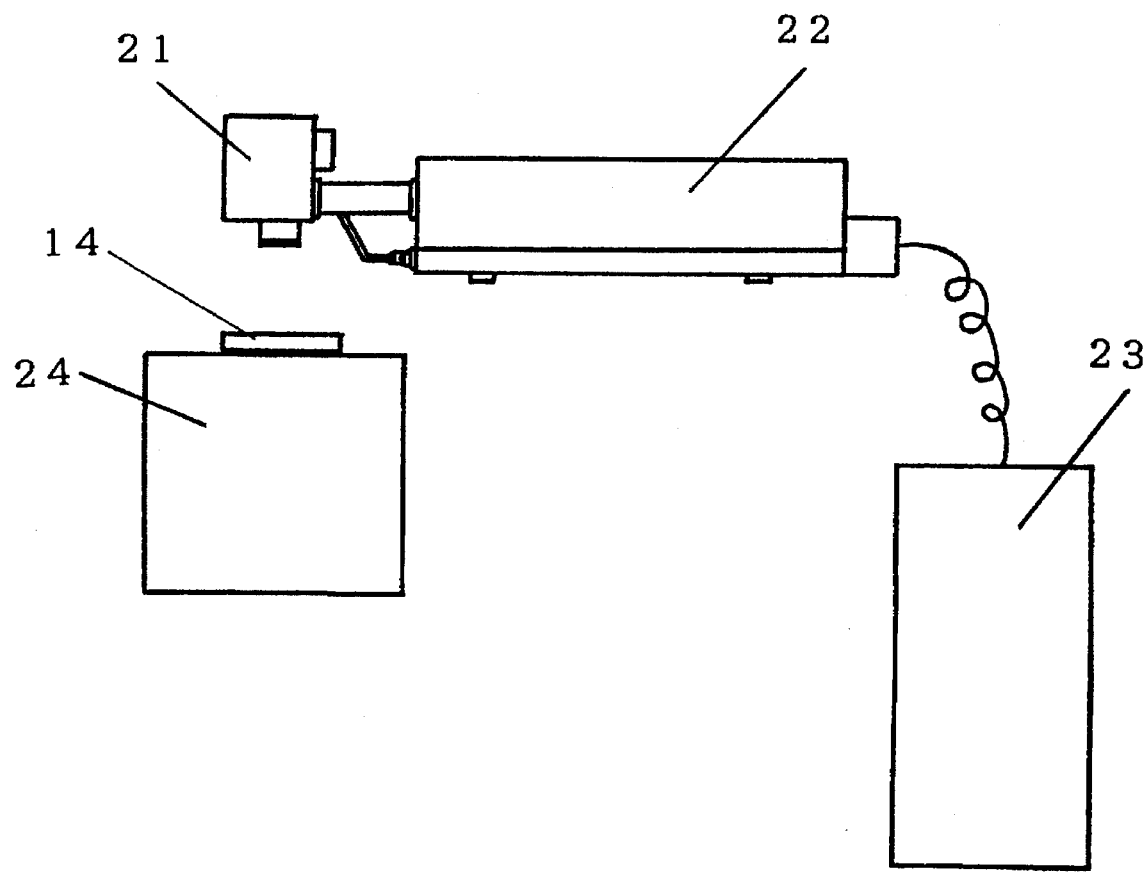
FIG. 6 is an elevational view of a scanning laser marker used to mark a code mark on a surgical instrument according to the present invention.

FIG. 6 is an elevational view of a scanning laser marker used to mark a code mark on a surgical instrument according to the present invention. Specifically, the scanning laser marker is comprised of a scanning unit 21, a laser head 22 and a controller 23. The scanning unit 21 is located to the front of the laser head 22, and marking is performed by placing surgical instruments 14 on work station 24 located under scanning unit 21. Controller 23 is comprised of a power unit, computer and keyboard. By using the keyboard, the current, marking speed and aperture are set, and the code mark is marked.

Figure 2:
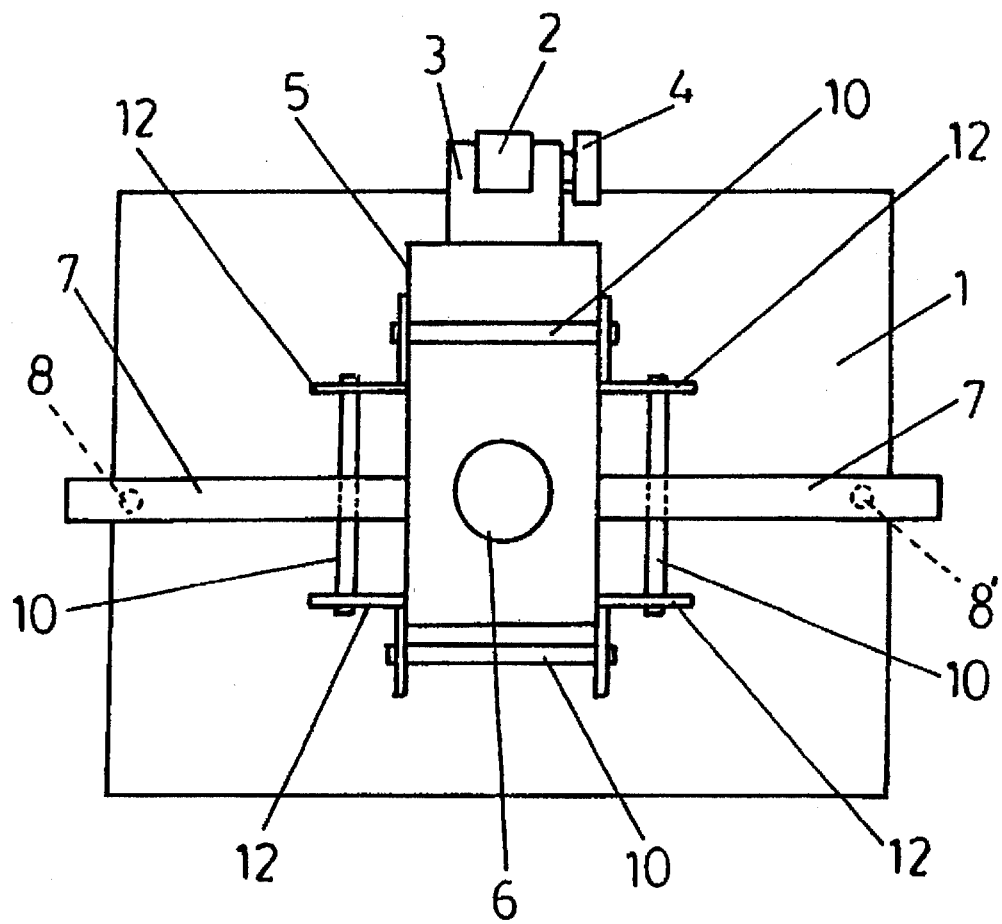
FIG. 2 is a plan view of the code mark reader.
Figure 3:
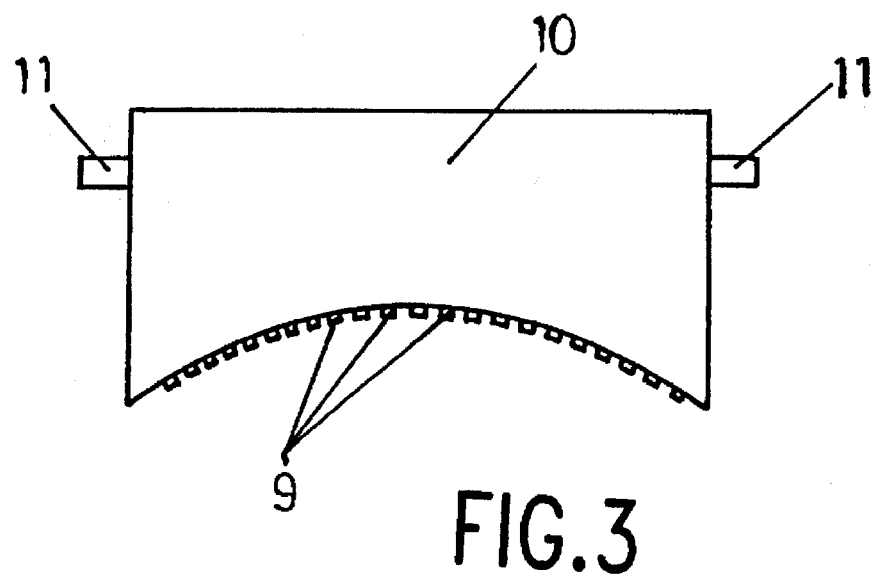
FIG. 3 is an enlarged front view of an illumination block.

A description will now be made of the method of reading the surgical instrument with a code mark according to the present invention by a code mark reader. First, one example of a code mark reader will be described with reference to FIGS. 1 to 3.

Denoted by reference numeral 1 is a stage on which an object to be read is placed, and 2 is a camera mount shaft vertically mounted on the object holding stage 1. 3 is a movable frame which is slidably fitted to the camera mount shaft 2, moves vertically, and can be fixed to the camera mount shaft 2 at any desired position by tightening clamp screw 4. As an alternative, it may be arranged such that thread grooves are linearly formed as a rack in the camera mount shaft 2 and a pinion gear is provided on the movable frame 3, allowing the movable frame 3 to move vertically through engagement between the pinion gear and the rack. Also, the object holding stage 1 may be arranged to be vertically movable. In any case, it is essential that the height of the camera be adjustable.

Denoted by 5 is a rectangular camera mount frame which has an opening at the top and bottom and is fixed to the movable frame 3. 6 is an infrared camera disposed in a central portion of the camera mount frame 5 with its lens facing the object holding stage 1. The camera 6 used in the illustrated embodiment is of fixed-focus type.

Denoted by 7 is a pair of laser beam irradiator mount shafts mounted to extend outward from both sides of the camera mount frame 5 in opposite relation. Laser beam irradiators 8, 8' are disposed at respective shaft ends so as to face obliquely downwards. These laser beam irradiators 8, 8' are set so that one irradiator 8 provides a spot of light elongated lengthwise (vertically) and the other irradiator 8' provides a spot of light elongated widthwise (horizontally). The two light spots intersect with each other in a crisscross at the position coincidental with the focus of the infrared camera 6. The laser beam spots may be elliptical in shape rather than linearly elongated, because it is only necessary to be able to discriminate which laser beam spot is provided by which irradiator.

Denoted by 9 is an infrared emitting diode for emitting an infrared ray. A plurality of infrared emitting diodes 9 are disposed in two rows on an illumination block 10. The illumination block 10 has a surface curved into an arcuate shape, and the infrared emitting diodes 9 are disposed along two arcuate lines on the curved surface. With such an arrangement, all the infrared emitting diodes are disposed at the same distance with respect to the center at which infrared rays are concentrated, and the object can be illuminated with light from more than one concentrated infrared ray more softly than would be with light of a single strong infrared ray from one infrared emitting diode. This is effective to prevent halation or other adverse effects. 11 is a pair of support shafts positioned at both sides of the illumination block 10 for attaching it in place.

Denoted by 12 is a pair of illumination block mount plates which are fixed to the outer surface of the camera mount frame 5 and are formed with elongated holes 13 for engagement with the support shafts 11 of the illumination block 10. Both support shafts 11 of the illumination block 10 are inserted in the respective elongated holes 13 so that the illumination block 10 is sandwiched by the pair of illumination block mount plates 12 with a relatively strong force, allowing the illumination block 10 to be adjusted in its support angle and position. A plurality of illumination blocks can be adjusted to change the brightness or the intensity of illumination independently of one another. While the four illumination blocks 10 are disposed in the rectangular form in the illustrated embodiment, it is only required that illumination block 10 be disposed plural in number so as to surround the infrared camera. The angle and brightness of each of the illumination blocks 10 are adjustable. It is also possible to automatically determine the shape of the object to be read, surface material of the object, etc. and to automatically adjust the angle and brightness of each of the illumination blocks depending upon the determination.

Figure 4:
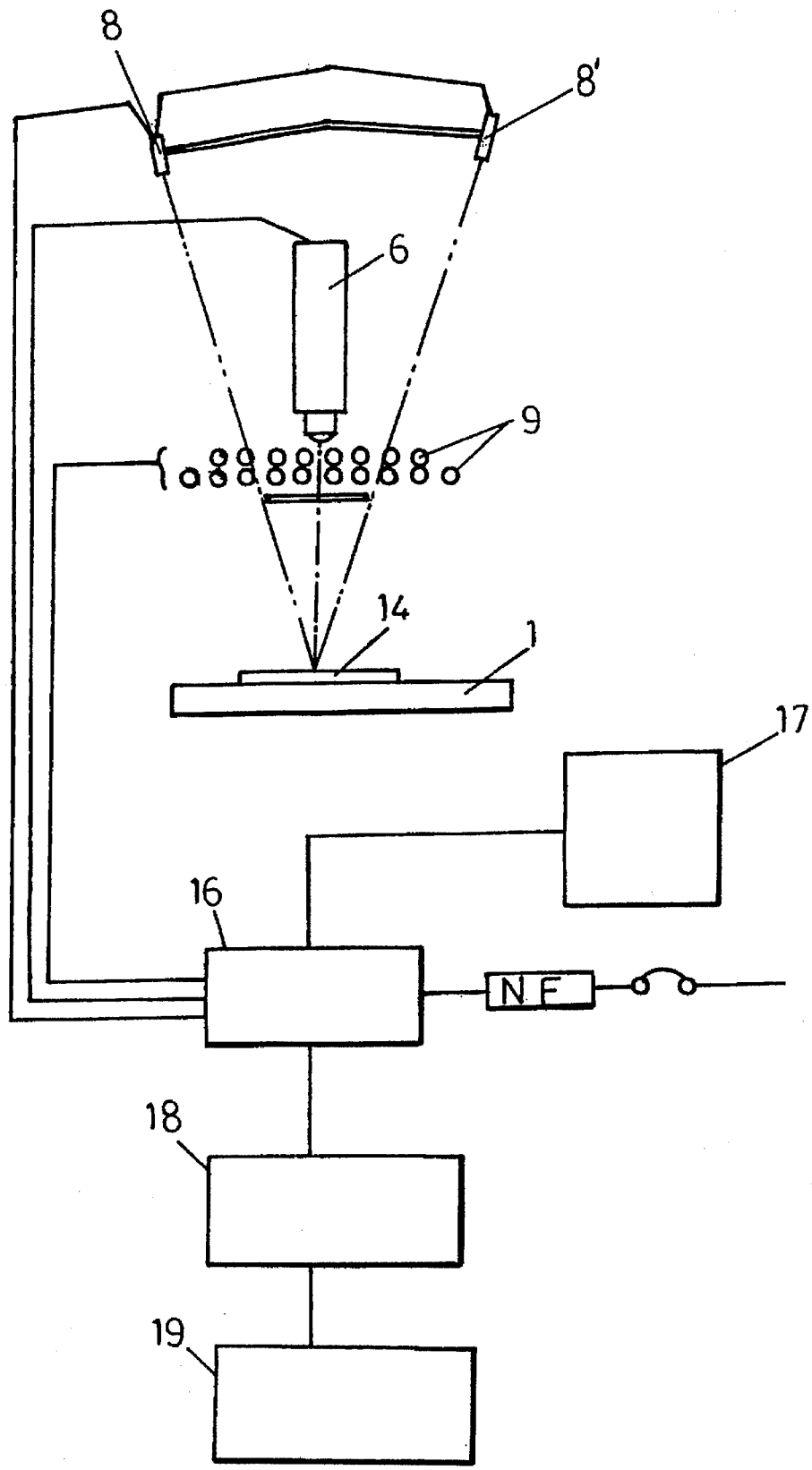
FIG. 4 is a block diagram of the system configuration for reading a code mark by using the code mark reader.

A description will now be made of the method of reading a code mark on a surgical instrument by using the code mark reader arranged as above with reference to FIG. 4. Let it be assumed that, as shown in FIG. 5, the code mark 15 in the form of, e.g., data code previously explained, is marked on the surgical instrument 14, as the object to be read, by oxidation marking or engraving using a laser beam. In the case of oxidation marking, marked portions are turned black. On the other hand, in the case of engraving marking, the data code 15 marked as a two-dimensional symbol is colored neither white nor black in itself, being comprised of recesses engraved by a laser beam and projections which are flush with the metal surface but, as a result of being not subjected to the laser beam, are projecting relative to the recesses.

First, the surgical instrument 14 marked with the data code 15 is placed on the object holding stage 1. Then, the position of the surgical instrument 14 is adjusted and, at the same time, the height of the infrared camera 6 is adjusted so that the data code 15 comes to the position where both the light spots of the laser beam irradiators 8 and 8' intersect with each other in a crisscross.

Subsequently, the angle and brightness of each illumination block 10 is adjusted. When the surface of the surgical instrument 14 is a mirror-finished surface, the surgical instrument 14 is illuminated by using only one illumination block 10 for the purpose of preventing halation. Then, the angle of that illumination block 10 is adjusted so as to prevent interference from the reflected light from the he surgical instrument 14 with the infrared camera 6, thereby preventing halation.

When the surface of the surgical instrument 14 is finished to a pear-skin finish by staining, the illuminated surface is not completely smooth, but has fine ruggedness which is likely to generate shadows. To prevent the occurrence of these shadows, all of the four illumination blocks 10 are turned on at the same brightness to illuminate the surgical instrument 14 with strong light.

Further, when the surface of the surgical instrument 14 has a hairline finish, fine lines extending in one direction are present on the surface and are likely to generate stripe-shaped shadows. To prevent the occurrence of these shadows, only two illumination blocks 10 disposed to face in a direction perpendicular to the fine lines are turned on, and the other two illumination blocks 10 disposed to face in a direction parallel to the fine lines are turned off. Note that the method and angle of illumination as described above may be adjusted by an operator at need while looking at a monitor 17.

Image information read by the infrared camera 6 of the code mark reader is input to a sub-controller 16, for example. The infrared camera 6 employs, as an image sensing device, a CCD having 410,000 pixels. Of these pixels, a central portion of 680 pixels wide and 480 pixels long is reproduced in the form of an image. Further, to increase reproducibility of black and white in the image, the sub-controller 16 is designed to adjust outputs for dots in the next line based on data of corresponding dots in the line of preceding 1H line for each pixel, thereby compensating for influences of halation or shadows.

Figure 7:
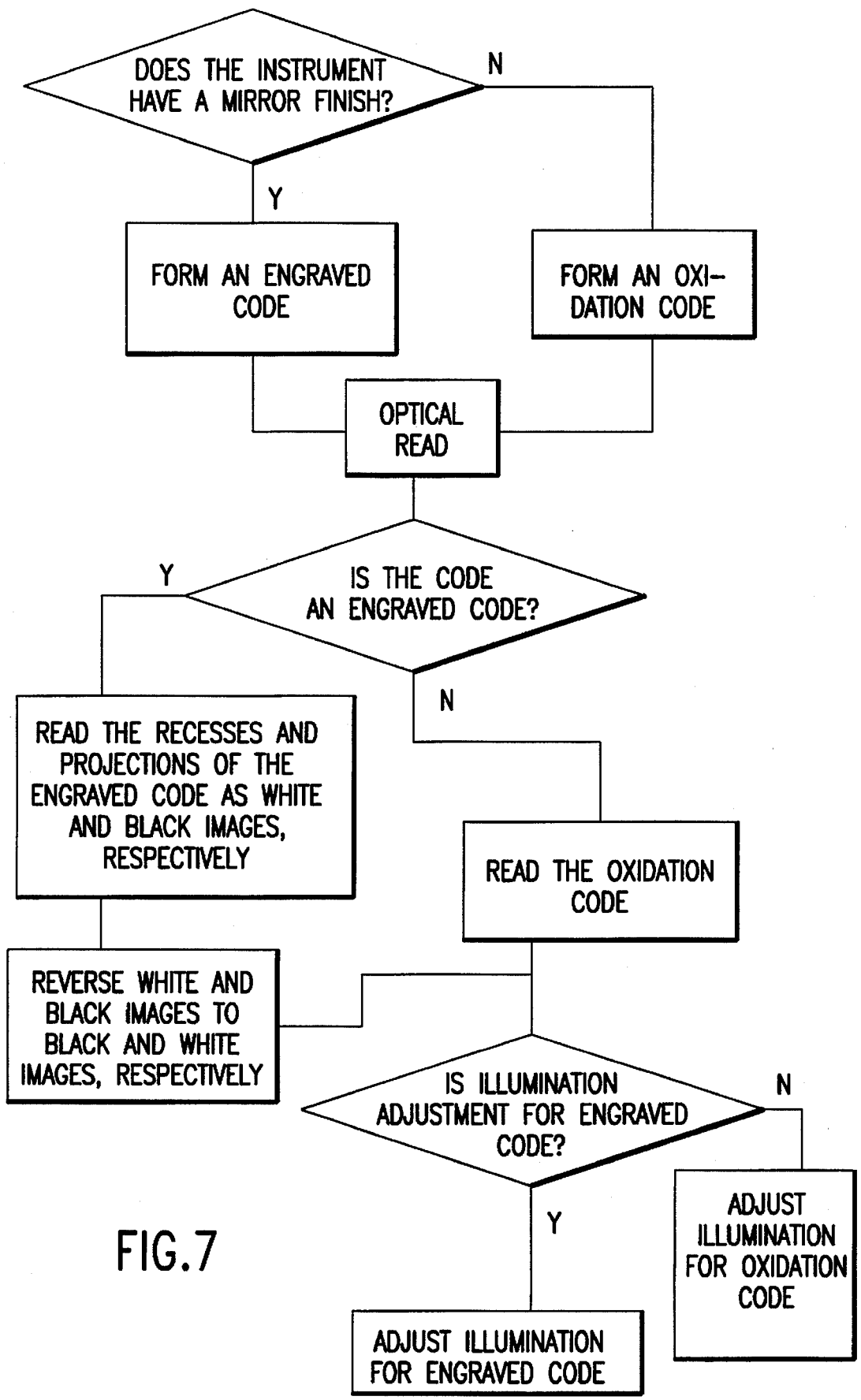
FIG. 7 is a flow diagram.

The sub-controller 16 is also designed to determine whether the marks are marked by engraving or oxidation marking, and to make the image reversed in black and white colors upon automatic or manual switching. More specifically, in the case of oxidation marking, the marked portions are black and hence reproduced to be also black in the image as they are. In the case of engraving marking, however, the marked portions (recesses) would be reproduced to be white in the image if directly output. For this reason, the image information is output after being reversed between black and white as shown in FIG. 7. The sub-controller 16 may be integral within the body of the code mark reader.

The output of the sub-controller 16 is applied to a monitor 17 and a controller 18. The monitor 16 enables the operator to visually confirm how the data code 15 is read. In the controller 18, the data code 15, given as the image information from the sub-controller 16, is converted into a matrix comprised of 0's and 1's and then into character information. Note that the image information read by the infrared camera 6 may be directly input to the controller 18 without being sent via the sub-controller 16.

The character information converted in the controller 18 is transmitted to a computer 19 and is compared with the information entered in the computer 19 beforehand, following which the input from the controller 18 is processed and stored as predetermined information in the computer. For example, information about surgical instruments which are necessary for a surgical set are stored in the computer 18 beforehand, these items are then compared with the information from the controller 18, and data indicating which of the necessary surgical instruments 14 have been input or stocked are successively stored in the computer.

When the information contained in the data code 15 has been correctly input to the computer 19, an indication in the form of voice or a message on the monitor screen is issued for each data code to inform the user of the completion of the data input operation. Also, if the data code has not been read as correct information because of, e.g., a failure in image reading thereof, an alarm sound or the like is issued to indicate incapability of reading. In this way, the information contained in the data code 15 marked on the surgical instrument 14 is stored one by one in the computer 19.

According to the code mark marking method for surgical instruments of the present invention, as described hereinabove, since an optically readable code mark is marked on a surgical instrument at an optional location by using a laser, even small marks can be precisely marked. This results in the advantage that even fine binary code marks, e.g., carla code, vericode and data code, can be correctly read by using a reader.

Also, according to the surgical instrument marked with a code mark of the present invention, since only marked recesses and projections can be read by a reader in the form of black and white images without being affected by ruggedness specific to the surface of the surgical instrument, engraving or oxidation marking can be used to mark the code mark. Since the code marked is marked directly on the surgical instrument itself, durability of the code mark can be considerably increased as opposed to conventional code marks which are prepared by printing the marks and sticking mark labels to the objects.

What is claimed is:

1. A method of marking and reading code marks on a plurality of metal objects in which some of said metal objects have a mirror finish and other of said objects have a non-mirror finish comprising the steps of selecting from said plurality of metal objects those metal objects which have a mirror-like finish, selecting from said plurality of metal objects those metal objects having a non-mirror finish, utilizing a laser to form on said metal objects having a mirror finish an engraved non-blackened code mark having recesses and projections, utilizing a laser to form on said selected metal objects having a non-mirror finish an oxidation blackened code mark, optically reading said engraved non-blackened code marks and said oxidation blackened code marks, said optical reading step comprising initially reading the recesses in said engraved non-blackened code mark as a white image and the projections in said engraved non-blackened code mark as a black image, feeding to a controller image information read by said optical reader, determining in said controller whether the individual code mark read by said optical read is an engraved non-blackened code mark or an oxidation blackened code mark, reversing said image information in said controller to reverse said white and black image to a black and white image, respectively when it is determined in said controller that the individual mark read by said optical reader is an engraved non-blackened code mark, said optical reading step further comprising illuminating said engraved non-blackened code marks and said oxidation blackened code marks, said illuminating step comprising adjusting the illumination according to whether an engraved non-blackened code mark is being read or whether an oxidation blackened code is being read.

2. A method according to claim 1 wherein said step of utilizing a laser to form said engraved code mark comprises utilizing said laser to form a code mark having depressions and projections in which said projections are flush with the surface of the surgical instrument.

3. A method according to claim 1 wherein said step of utilizing a laser to form said engraved code mark comprises subjecting the portions of said surgical instrument with said depressions to said laser beam and not subjecting the portions of said surgical instrument with said projections to said laser beam.

4. A method according to claim 1 wherein said step of utilizing a laser to form said engraved code mark comprises utilizing said laser to form non-blackened engraved areas on said surgical instruments having said mirror finish.

5. A method according to claim 1 wherein said illuminating step comprises utilizing a plurality of illuminating blocks disposed about a stage area on which a metal object having a code mark is to be optically read, said adjusting step comprising adjusting the number of said illuminating blocks used to illuminate the metal object on said stage area.

6. A method according to claim 1 wherein said illuminating step comprises utilizing a plurality of illumination blocks disposed about a stage area on which a metal object having a code mark is to be optically read, said adjusting step comprising adjusting the angle of said illumination blocks relative to the metal object on said stage area.

7. A method according to claim 1 wherein said adjusting step comprises adjusting the amount of said illumination on an engraved non-blackened code mark being optically read according to the finish on said metal object having said engraved non-blackened code mark.

8. A method according to claim 1 wherein said illuminating step comprises utilizing a plurality of illuminating blocks disposed about a stage area on which a metal object having an engraved non-blackened code mark is to be optically read, said adjusting step comprising adjusting the angle of said illumination blocks relative to the metal object on said stage area according to the direction of fine lines in the finish of the metal object having an engraved non-blackened code mark.

9. A method according to claim 1 wherein said adjusting step comprises adjusting said illumination to prevent holations and shadows on the code mark being optically read.

10. A method according to claim 1 wherein said metal objects are surgical instruments.

11. A method according to claim 1 wherein said code marks are binary code marks.

12. A method of marking, reading and managing use of a plurality of surgical instruments in which some of said plurality of surgical instruments have a mirror finish and other of said plurality of surgical instruments have a non-mirror surface, comprising the steps of selecting from said plurality of surgical instruments those surgical instruments which have a mirror finish, selecting from said plurality of surgical instruments those surgical instruments having a non-mirror finish, utilizing a laser to form on said surgical instruments having a mirror finish an engraved code mark having recesses and projections, utilizing a laser to form on said selected surgical instruments having a non-mirror finish an oxidation code mark, optically reading said engraved code marks and said oxidation code marks utilizing an optical reader, said optical reading step comprising initially reading the recesses in said engraved non-blackened code mark as a white image and the projections in said engraved non-blackened code mark as a black image, feeding to controller image information read by said optical reader. determining in said controller whether the individual code mark read by said optical read is an engraved non-blackened code or an oxidation blackened code mark, reversing said image information in said controller to reverse said white and black image to a black and white image respectively when it determined in said Controller that the individual mark read said optical reader is an engraved non-blackened code mark, said optical reading step further comprising illuminating said engraved code marks and said oxidation code marks, said illuminating step comprising adjusting the amount and angle of illumination according to whether an engraved code mark is being read or whether an oxidation code is being read, feeding to a computer the image information read by said optical reader during said optical reading step, storing in said computer data relating to surgical instruments necessary for a surgical set, and comparing said image information fed to said computer by said optical reader with said stored data in said computer relating to surgical instruments necessary for a surgical set to thereby provide information on those surgical instruments which have been read by said optical reader relative to the surgical instruments necessary to complete a surgical set.

* * * * *